United States Patent [19]
Hassall et al.

[11] Patent Number: 6,097,929
[45] Date of Patent: Aug. 1, 2000

[54] METHOD AND SYSTEM FOR MONITORING AND CONTROLLING A SINGLE CHANNEL PER CARRIER SATELLITE LINK BETWEEN TWO REMOTE EARTH STATIONS

[75] Inventors: Jeremy Hassall, Potomac, Md.; Robert Gooch, Vienna, Va.

[73] Assignee: Telogy Networks, Inc., Germantown, Md.

[21] Appl. No.: 08/810,699

[22] Filed: Mar. 3, 1997

[51] Int. Cl.[7] .................................................. H04B 7/185
[52] U.S. Cl. ........................ 455/12.1; 455/67.1; 455/423
[58] Field of Search .................... 455/427, 430, 455/12.1, 13.1, 13.2, 70, 67.1, 423, 434, 515

[56] References Cited

U.S. PATENT DOCUMENTS

| | | | |
|---|---|---|---|
| 4,018,993 | 4/1977 | Edstrom | 179/15 BY |
| 4,261,054 | 4/1981 | Scharla-Nielsen | 455/12 |
| 4,273,962 | 6/1981 | Wolfe | 179/7.1 R |
| 4,509,200 | 4/1985 | Luginbuhl et al. | 455/13.2 |
| 4,633,510 | 12/1986 | Suzuki et al. | 455/12.1 |
| 4,697,187 | 9/1987 | Ohno et al. | 342/358 |
| 4,910,792 | 3/1990 | Takahata et al. | 455/10 |
| 4,995,096 | 2/1991 | Isoe | 455/12.1 |
| 5,020,131 | 5/1991 | Isoe | 455/13.2 |
| 5,410,729 | 4/1995 | Kumagai et al. | 455/12.1 |
| 5,537,406 | 7/1996 | Bringer | 370/77 |
| 5,737,684 | 4/1998 | Goto | 455/12.1 |
| 5,809,420 | 9/1998 | Ichiyanagi et al. | 455/12.1 |

FOREIGN PATENT DOCUMENTS

| | | | |
|---|---|---|---|
| 2-005631 | of 1990 | Japan | 455/13.4 |
| 2-047934 | of 1990 | Japan | 455/13.4 |

*Primary Examiner*—Reinhard J. Eisenzopf
*Assistant Examiner*—Marsha D. Banks-Harold
*Attorney, Agent, or Firm*—Roberts & Brownell, LLC

[57] ABSTRACT

A method and system whereby a network management control center can monitor and control point-to-point remote satellite communication links without a physical connection between the remote satellite control modems and the network management control center. This method and system provides greater efficiency with reduced costs through rapid reconfiguration of remote satellite control modems. The method and system can actively cause either remote satellite control modem to terminate link transmission, which allows the network management control center to establish a maintenance link with the other remote satellite control modem, through a local satellite control modem. The maintenance link is used to modify operating parameters of the remote satellite control modem. Once parameters are changed at the first remote satellite control modem, the process is repeated for the other remote satellite control modem. After all operating parameters are modified, the network management control center causes the local satellite control modem to terminate all maintenance links and the remote satellite control modems reset and reestablish a link with the new parameters.

30 Claims, 5 Drawing Sheets

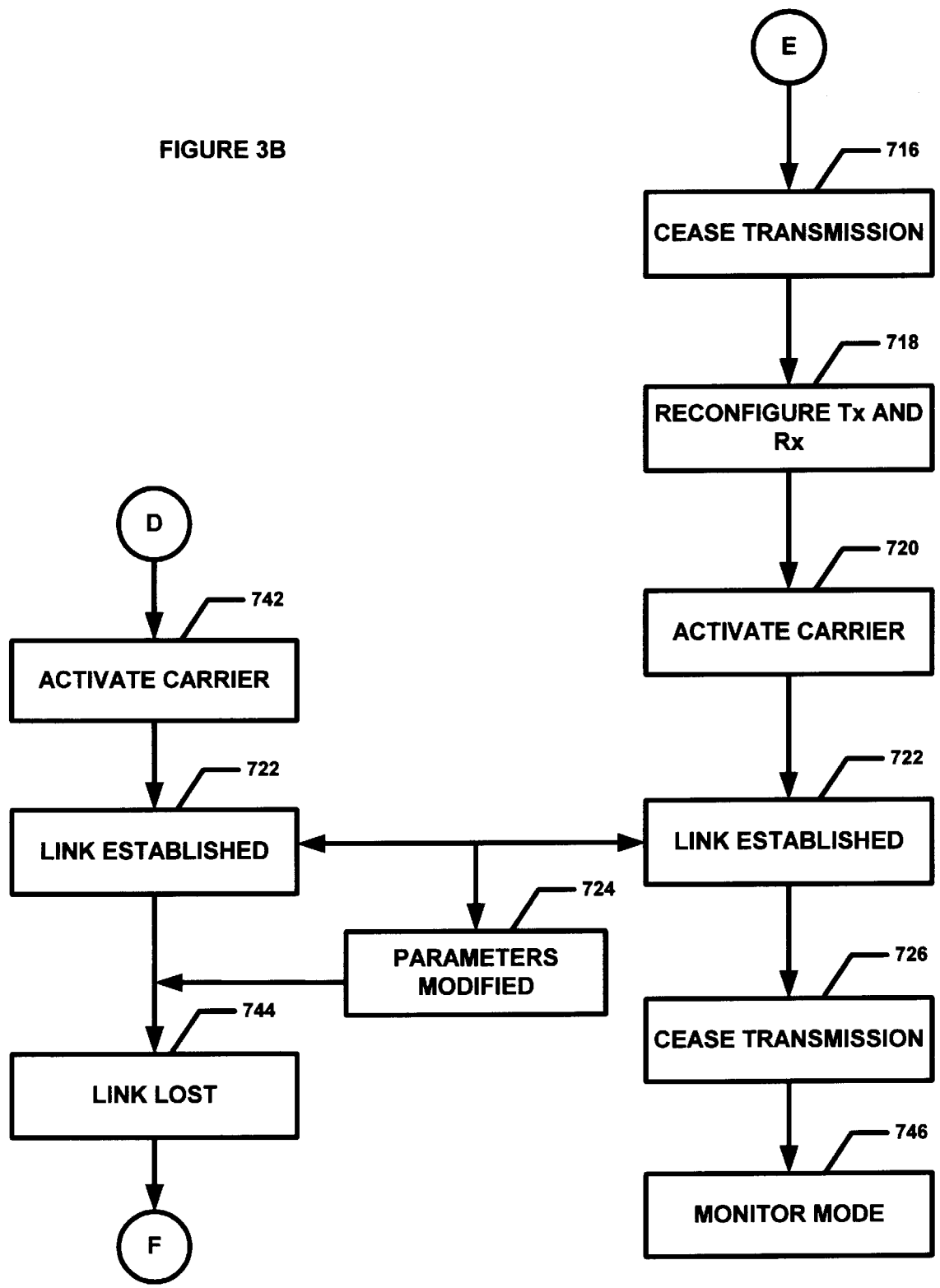

METHOD AND SYSTEM FOR MONITORING AND CONTROLLING A SINGLE CHANNEL PER CARRIER SATELLITE LINK BETWEEN TWO REMOTE EARTH STATIONS

FIELD OF THE INVENTION

The present invention relates to a method and system whereby a network management control center can monitor and control point-to-point remote satellite communication links without a physical connection between the remote satellite control modems and the network management control center.

BACKGROUND OF THE INVENTION

Single Channel Per Carrier (SCPC) point to point satellite communications require rigorous control of certain parameters to establish and maintain the satellite link. Some of those parameters are the transmit and receive radio frequency (RF) of the carrier, the intermediate frequency (IF), symbol or data rate, modulation type, error correction type and rate, and power transmit level. Some of those parameters, like the transmit and receive RF, are set and remain constant over long periods of time, while others, like transmit power and symbol rate, are changed on a more frequent basis to compensate for changed environmental conditions or customer needs. Network management control centers, which monitor multiple SCPC satellite links, are established to accommodate those more dynamic changes that maintain the end-to-end satellite communication service at optimal efficiency in response to customer needs.

A network management control center frequently consists of a computer that is physically connected to one or many local satellite control modems with some form of electronic connection. The electronic connection might be a simple twisted wire pair, some form of local area network, or a dial-up land line connection using the public switched telephone network (PSTN). When the network management control center is connected to the local satellite control modem with a dial-up land line connection via the PSTN, two conventional telephone type modems, one at the network management control center and one at the local satellite control modem replace the twisted wire pair or local area network connection. This arrangement also requires a PSTN connection between the network management control center and the local satellite control modem. Using any of the connections described, the local satellite control modems can generally be programmed from the network management control center with the parameters described above (IF, symbol rate, modulation type, power, etc.).

To support management of the SCPC satellite link, where one end of the link is connected to a network management control center through a local satellite control modem, a small portion of the channel bandwidth is often allocated to an "overhead" channel. This overhead channel is used by both satellite control modems to pass operational status and statistics messages, and also allows the network management control center to monitor and control the distant satellite control modem.

Typically, a network management control center will establish threshold levels or trend profiles for certain parameters which will alert an operator in the network management control center that action or intervention may be required. The operator can also typically select or monitor any of the managed SCPC satellite links for anomalies or trends that do not trigger an alert. If an anomaly or trend is identified that requires corrective action, that same overhead channel which exchanges statistics between the satellite control modems can also be used to implement changes in some of the parameters that were described above.

An example using the overhead channel to implement changes in a parameter might be where the network management control center determines that the transmit power level at the distant satellite control modem needs to be increased because the BER has increased to an unacceptable level. In that case, an operator at the network management control center could pass a new power level parameter to the distant satellite control modem through the overhead channel. That new power level parameter would be stored in a future data parameter area at the distant satellite control modem awaiting activation. After verification that the new power level parameter stored in the future data parameter area was properly received, the network management control center could use the overhead channel to command that new power level parameter from the future into the active data parameter area, where it would increase the transmit power level at the distant satellite control modem. If that step successfully resolved the BER problem, the operator at the network management control center could then command the distant satellite control modem, through the overhead channel, to write that new power level parameter in the distant satellite control modem, from the active data parameter area to NVRAM where it would remain indefinitely. That new power level parameter, now stored in NVRAM at the distant satellite control modem would be used for any subsequent reset or power-up.

The methods described above allow a single network management control center to monitor and control multiple SCPC satellite links without routine visits to the distant satellite control modems. This centralized network management has the advantage of keeping manpower costs low, while providing an ability to rapidly change parameters in response to environmental factors or user requirements. However, there are certain limitations in the methods described. Physical connection of the network management control center and local satellite control modem with either twisted wire pairs, or a form of local area network becomes more difficult and costs increase dramatically as the distance between the network management control center and the local satellite control modem increases beyond a few miles. The alternative, use of two telephone type modems and the PSTN does extend the range for network management, but requires additional hardware with associated expense, as well as access to the PSTN, with associated expense.

Existing methods and systems do not provide responsive network management services to SCPC remote satellite control modems that lack physical connections (e.g. twisted wire pair, local area network, or dial-up land line connection). Those remote satellite control modems require periodic visits during which the overhead channel described above is monitored and parameter changes are implemented. Those individual site visits entail travel time and are significantly less responsive than a centralized network management control center in implementing parameter changes to accommodate environmental effects or satisfy dynamic customer needs.

SUMMARY OF THE INVENTION

One object of the present invention is to provide a method and system that will achieve central network management control of SCPC point-to-point remote satellite control modems that are not accessible from a network management control center through either physical connection (twisted wire pair or local area network) or through a dial-up land line connection using the PSTN.

It is another object of the present invention to provide greater efficiency with reduced costs through rapid reconfiguration of remote satellite control modems without need for physical connection, additional equipment or periodic visit to the remote satellite control modems.

It is a third object of the present invention to provide a routine real-time monitor capability for remote SCPC point-to-point satellite links in order to rapidly identify changes in performance.

It is a fourth object of the present invention to accomplish the other objectives with minimal modification to existing procedures, network management control center equipment, and existing satellite control modem equipment.

The foregoing objects can be accomplished with a method and system whereby a network management control center, with a physically associated local satellite control modem, can passively monitor an overhead channel that is part of and exists between two remote satellite control modems which are not directly connected to the network management control center. The method and system can then actively cause either remote satellite control modem to terminate link transmission, which allows the network management control center to establish a maintenance link with the other remote satellite control modem, through the local satellite control modem. This maintenance link, between the local satellite control modem and the remote satellite control modem allows the network management control center to modify certain operating parameters in the linked remote satellite control modem. Once parameter changes are complete at the first remote satellite control modem, the process can be repeated for the other remote satellite control modem. Finally, when the network management control center causes the local satellite control modem to terminate the maintenance link, the remote satellite control modems will reset and reestablish a link between themselves with the new parameters.

BRIEF DESCRIPTION OF THE DRAWINGS

FIG. 3B illustrates the logic flow for transition from passive monitoring to active control and back to passive monitoring of remote satellite control modems (cont.).

DETAILED DESCRIPTION

Figure 1:
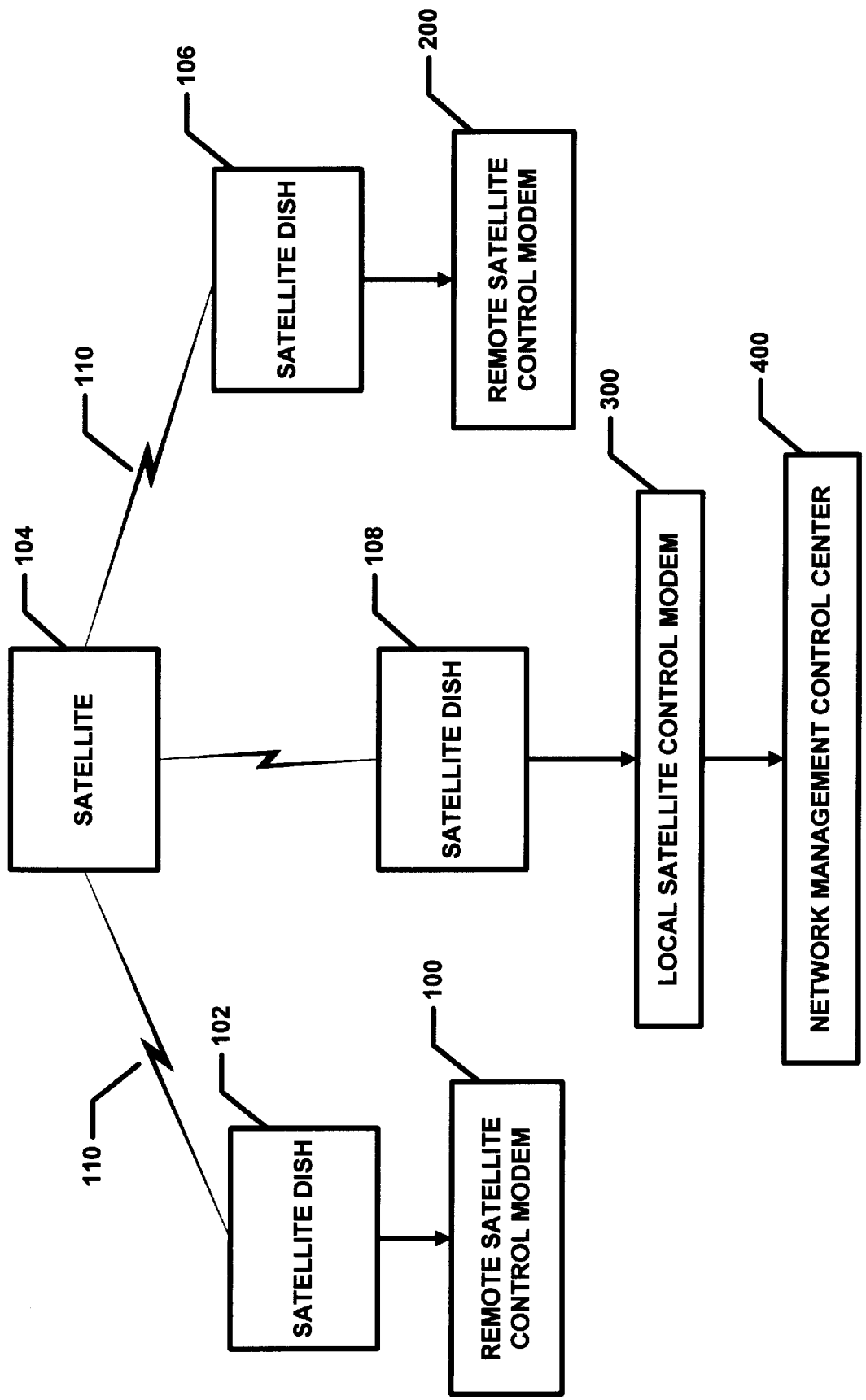
FIG. 1 illustrates the relationship of equipment required for a network management center to passively monitor a link between two remote satellite control modems.

Referring to FIG. 1, the preferred embodiment of the present invention is shown. The invention involves a method and apparatus whereby the remote satellite control modems, 100 and 200, each of which are connected to antennas 102 and 106 respectively, are configured to periodically broadcast alarms, detailed status and statistics on an overhead channel 110 communicating with satellite 104. They are further required to notify the other, via the overhead channel, whenever they lose lock. The present invention further employs a local satellite control modem 300 that is connected to a satellite communication receive antenna 108 and that is physically connected to a network management control center 400 which can passively monitor the overhead channels established between the remote satellite control modems 100 and 200, including all alarm messages, status messages, and statistics. Monitor of the overhead channel, allows out of condition parameters to be detected and maintenance performed via intervention or change of parameters at remote satellite control modems 100, 200.

Figure 2:
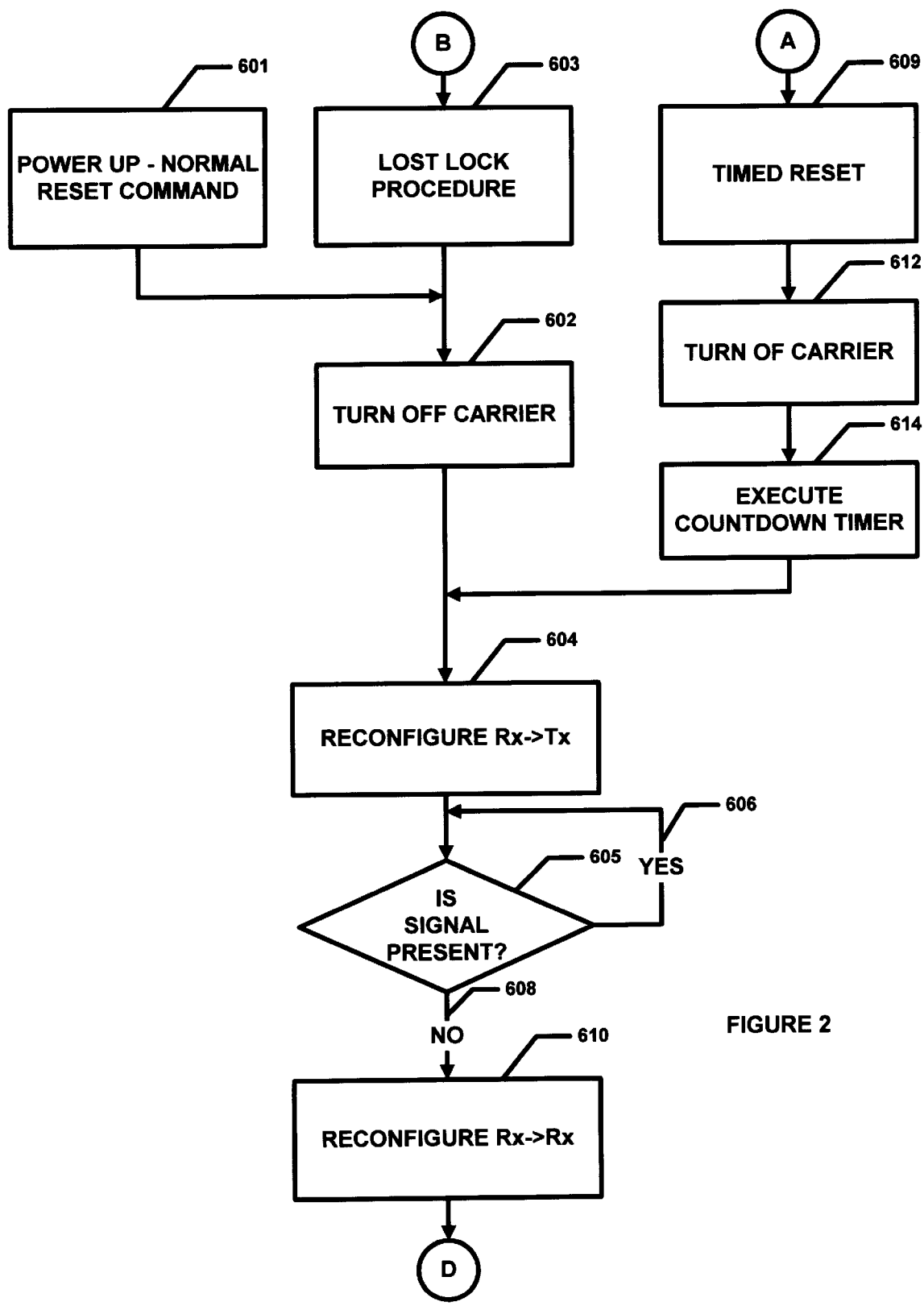
FIG. 2 illustrates the logic flow for timed reset, power-up reset, and lost link reset of remote satellite control modems.

Referring to FIG. 2, the preferred embodiment of the present invention further involves a method and system whereby upon power up and command for normal reset 601, or receipt of a lost lock notice 603 from a remote satellite control modem, the receiving remote satellite control modem must turn its carrier off 602 and reconfigure its receive demodulator IF to its own transmitter modulator IF 604. The system next determines if a signal is present 605. If a signal is detected 606, the remote satellite control modem will remain inactive (no carrier transmission) until such time as it detects that the signal, which is transmitting at its own transmitter modulator IF, has ceased. Upon detection that the signal is no longer present 608, the remote satellite control modem reconfigures its receive demodulator IF back to its own receive demodulator IF 610.

Upon command to perform a timed reset 609, the remote satellite control modem must disable its carrier 612 according to a countdown timer 614. Upon expiration of the countdown timer, the receiving remote satellite control modem reconfigures its receive demodulator IF to its own transmitter modulator IF 604. If a signal is detected 606, the remote satellite control modem will remain inactive (no carrier transmission) until such time as it detects that the signal, which is transmitting at its own transmitter modulator IF, has ceased. Upon detection that the signal is no longer present 608, the remote satellite control modem reconfigures its receive demodulator IF back to its own receive demodulator IF 610.

Figure 3A:
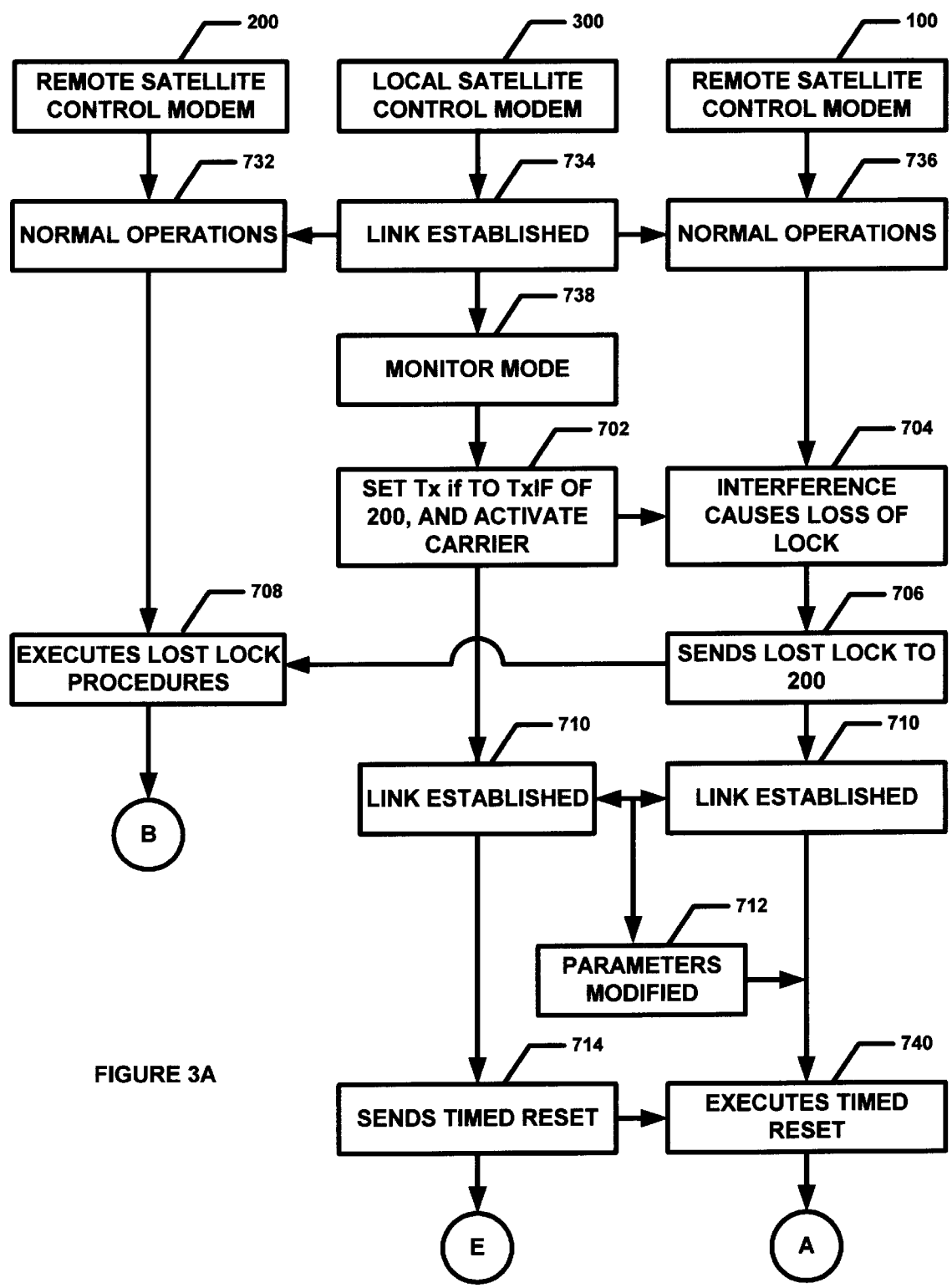
FIG. 3A illustrates the logic flow for transition from passive monitoring to active control and back to passive monitoring of remote satellite control modems.
Figure 3C:
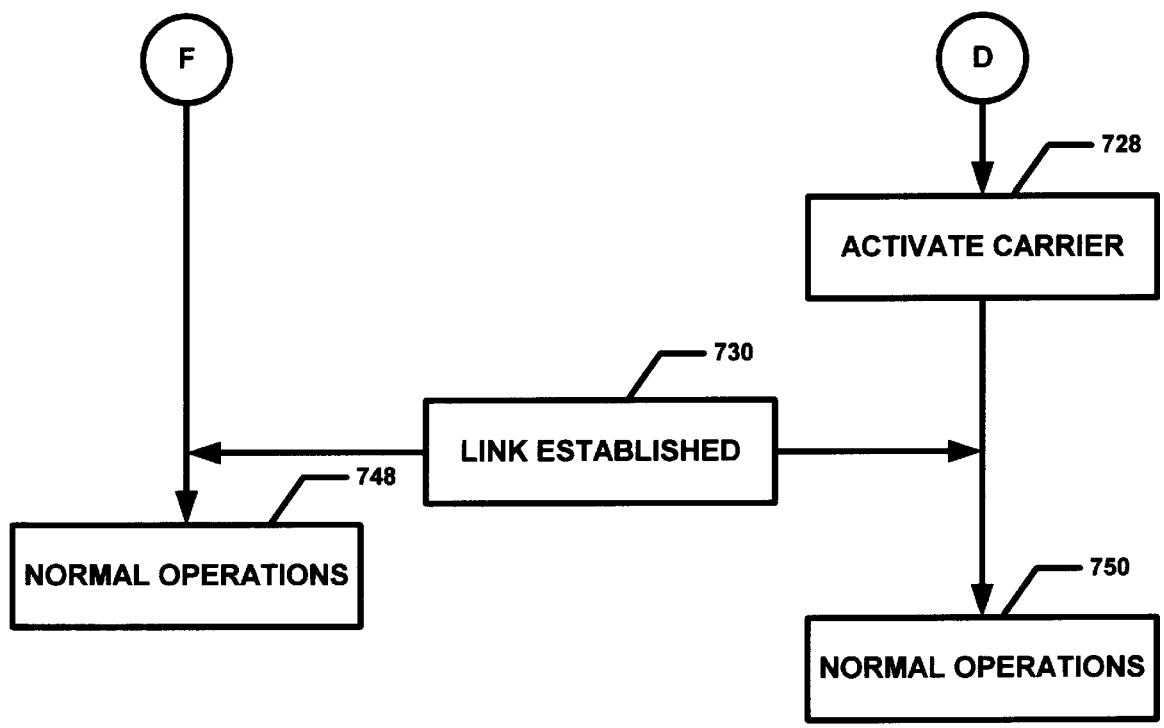
FIG. 3C illustrates the logic flow for transition from passive monitoring to active control and back to passive monitoring of remote satellite control modems (cont.).

Referring to FIG. 3A, the preferred embodiment is further accomplished by a method and system whereby the transmit IF of the local satellite control modem 300 After establishing a link 734 to the system and monitoring the system 738 for instructions, the modem is set to the transmit IF 702 of remote satellite control modem 200, and the local satellite control modem 300 receive IF is set to the transmit IF of remote satellite control modem 100. When local satellite control modem 300 carrier is turned on, remote satellite control modem 100 formerly in normal operations mode 736, loses lock 704. Remote satellite control modem 100 sends a lost lock notice 706 to remote satellite control modem 200 on the overhead channel. Remote satellite control modem 200 also formerly in normal operations mode 732, responds by executing lost lock procedures 708. Local satellite control modem 300, which is transmitting on the IF of remote satellite control modem 200, now establishes a full lock maintenance link 710 with remote satellite control modem 100. A network operator is now able to modify parameters 712 of remote satellite control modem 100 through this maintenance link established by local satellite control modem 300. When the network operator has completed desired parameter changes in remote satellite control modem 100, local satellite control modem 300 issues a timed reset 714 to remote satellite control modem 100. Remote satellite control modem 100 executes a timed reset. Referring now to FIG. 3B, the logic flow is continued. Local satellite control modem 300 immediately stops transmitting 716 on the IF of remote satellite control modem 200.

Referring again to FIG. 2, remote satellite control modem 200 no longer sees a signal 608 from local satellite control modem 300 and reconfigures its receive demodulator IF back to its receive IF 610.

Referring to again to FIG. 3B, local satellite control modem 300 transmit IF is set to transmit IF of remote satellite control modem 100 and turned on 720 while local satellite control modem 300 receive IF is set to transmit IF of remote satellite control modem 200 [*Note: the timed reset 609 that modem 100 was issued must be longer than the time it takes for modem 300 to be reconfigured— otherwise modem 100 and modem 200 will attempt to re-establish communications with each other] and local satellite control modem 300 is able to establish a full lock maintenance link 722 with remote satellite control modem 200. The network operator is now able to modify parameters 724 of remote satellite control modem 200. When the network operator has completed the desired parameter changes in remote satellite control modem 200, local satellite control modem 300 stops transmitting 726 on the IF of remote satellite control modem 100 causing the link to satellite modem 200 to be lost and the system to revert to the monitor mode 746. Remote satellite control modem 100 turns on its carrier 728. Remote satellite control modem 100 and 200 now re-establish a link 730 with the new parameters and both modems return to normal operations 750 and 748 respectively.

What is claimed is:

1. A method for monitoring and controlling a single channel per carrier communication link comprising:
   (a) providing a network management control center, with transmit and receive link capability;
   (b) providing a first remote station and a second remote station, with transmit, receive and overhead link capability for exchange of link parameters;
   (c) monitoring the overhead channel at the network management control center between the first and second remote station;
   (d) causing the first remote station to cease link;
   (e) establishing a link between the network management control center and the second remote station;
   (f) modifying the link parameters at the second remote station;
   (g) causing the second remote station to cease link;
   (h) establishing a link between the network management control center and the first remote station;
   (i) modifying link parameters at the first remote station; and
   (j) causing the first and second remote stations to re-establish link using the modified link parameters.

2. The method for monitoring and controlling a single channel per carrier communication link of claim 1 wherein providing the communication link further comprises:
   (a) providing a satellite communication link.

3. The method for monitoring and controlling a single channel per carrier communication link of claim 1 wherein providing the network management control center further comprises:
   (a) providing a transmitter;
   (b) providing a receiver; and
   (c) providing a local control modem interfaced to the transmitter and the receiver for establishing and maintaining a communication link between the network management control center and a remote station.

4. The method for monitoring and controlling a single channel per carrier communication link of claim 1 wherein providing the first and second remote station each further comprises:
   (a) providing a transmitter;
   (b) providing a receiver; and
   (c) providing a control modem interfaced to the transmitter and the receiver for establishing and maintaining communication links between remote stations and the network management control center.

5. The method for monitoring and controlling a single channel per carrier communication link of claim 1 wherein the providing the overhead channel further comprises:
   (a) providing an overhead channel within the communication link between the first and second remote stations.

6. The method for monitoring and controlling a single channel per carrier communication link of claim 1 wherein modifying link parameters at the second remote station further comprises:
   (a) providing a future data parameter area;
   (b) providing a current data parameter area;
   (c) providing a non-volatile memory;
   (d) passing a new parameter to the remote station;
   (e) storing the new parameter in the future data parameter area;
   (f) verifying that the new parameter was properly received;
   (g) commanding the new parameter into the current data parameter area;
   (h) testing the communication link using the new parameter; and
   (i) commanding the new parameter into the non-volatile memory if the new parameter resolved the problem.

7. The method for monitoring and controlling a single channel per carrier communication link of claim 1 wherein causing the first remote station to cease link further comprises:
   (a) transmitting by the network control station on the first remote transmit frequency, to cause interference on the second remote receive frequency;
   (b) losing link at the second remote station;
   (c) sending a lost link indication from the second remote to the first remote station; and
   (d) performing a reset procedure at the first remote station.

8. The method for monitoring and controlling a single channel per carrier communication link of claim 6 wherein performing the reset procedure at the first remote station further comprises;
   (a) turning off the transmitter;
   (b) reconfiguring the receive demodulator to the transmitter frequency;
   (c) keeping the transmitter turned off if another signal is detected on the transmitter frequency; and
   (d) reconfiguring the receive demodulator back to the receiver frequency and turning on the transmitter if another signal is not longer detected on the transmitter frequency.

9. The method for monitoring and controlling a single channel per carrier communication link of claim 1 wherein establishing a link between the network management control center and the second remote station further comprises:
   (a) configuring the transmit frequency of the network management control center to the transmit frequency of the first remote station;

(b) configuring the receive frequency of the network management control center to the receive frequency of the first remote station;

(c) turning on the transmitter; and (d) establishing a link between the network management control center and the second remote station after the first remote station ceases transmission.

10. The method for monitoring and controlling a single channel per carrier communication link of claim 1 wherein modifying link parameters at the second remote station further comprises:

(a) providing non volatile memory for storage of link parameters at the second remote station; and (b) using the overhead channel between the network management channel and the second remote station to modify link parameters in the non volatile memory of the second remote station.

11. The method for monitoring and controlling a single channel per carrier communication link of claim 1 wherein causing the second remote station to cease link further comprises:

(a) issuing a command to perform a timed reset over the link from the network management control center to the second remote station.

12. The method for monitoring and controlling a single channel per carrier communication link of claim 11 wherein performing the timed reset further comprises:

(a) turning off the transmitter;

(b) executing a countdown timer;

(c) reconfiguring the receive demodulator to the transmitter frequency on expiration of the countdown timer;

(d) keeping the transmitter turned off if another signal is detected on the transmitter frequency; and (e) reconfiguring the receive demodulator back to the receiver frequency and turning on the transmitter if another signal is not longer detected on the transmitter frequency.

13. The method for monitoring and controlling a single channel per carrier communication link of claim 1 wherein establishing a link between the network management control center and the first remote station further comprises:

(a) configuring the transmit frequency of the network management control center to the transmit frequency of the second remote station;

(b) configuring the receive frequency of the network management control center to the receive frequency of the second remote station;

(c) turning on the transmitter; and (d) establishing a link between the network management control center and the first remote station after the second remote station ceases transmission.

14. The method for monitoring and controlling a single channel per carrier communication link of claim 1 wherein modifying link parameters at the first remote station further comprises:

(a) providing non volatile memory for storage of link parameters at the first remote station; and (b) using the overhead channel between the network management channel and the first remote station to modify link parameters in the non volatile memory of the first remote station.

15. The method for monitoring and controlling a single channel per carrier communication link of claim 1 wherein causing the first and second remote stations to re-establish link using the modified link parameters further comprises:

(a) turning the transmitter off at the network management control center, resulting in no interference on the transmission frequencies of either the first or second remote stations and allowing the remote stations to re-establish link.

16. A system for monitoring and controlling a single channel per carrier communication link comprising:

(a) a network management control center, with transmit and receive link capability;

(b) a first remote station;

(c) a second remote station, each remote station with transmit and receive link capability;

(d) an overhead channel between the remote stations for exchange of link parameters;

(e) means for monitoring the overhead channel at the network management control center between the first and second remote station;

(f) means for causing the first remote station to cease link;

(g) means for establishing a link between the network management control center and the second remote station;

(h) means for modifying link parameters at the second remote station;

(i) means for causing the second remote station to cease link;

(j) means for establishing a link between the network management control center and the first remote station;

(k) means for modifying link parameters at the first remote station; and (l) means for causing the first and second remote stations to re-establish link using the modified link parameters.

17. The system for monitoring and controlling a single channel per carrier communication link of claim 16 wherein the communication link further comprises:

(a) a satellite communication link.

18. The system for monitoring and controlling a single channel per carrier communication link of claim 16 wherein the network management control center further comprises:

(a) a transmitter;

(b) a receiver; and (c) a local control modem interfaced to the transmitter and the receiver for establishing and maintaining a communication link between the network management control center and a remote station.

19. The system for monitoring and controlling a single channel per carrier communication link of claim 16 wherein the first and second remote station each further comprises:

(a) a transmitter;

(b) a receiver; and (c) a control modem interfaced to the transmitter and the receiver for establishing and maintaining communication links between remote stations and the network management control center.

20. The system for monitoring and controlling a single channel per carrier communication link of claim 16 wherein the overhead channel further comprises:

(a) an overhead channel within the communication link between the first and second remote stations.

21. The system for monitoring and controlling a single channel per carrier communication link of claim 16 wherein the means for modifying link parameters at the second remote station further comprises:

(a) a future data parameter area;

(b) a current data parameter area;

(c) a non-volatile memory;

(d) means for passing a new parameter to the remote station;

(e) means for storing the new parameter in the future data parameter area;

(f) means for verifying that the new parameter was properly received;

(g) means for commanding the new parameter into the current data parameter area;

(h) means for testing the communication link using the new parameter; and (i) means for commanding the new parameter into the non-volatile memory if the new parameter resolved the problem.

22. The system for monitoring and controlling a single channel per carrier communication link of claim 16 wherein the means for causing the first remote station to cease link further comprises:

(a) means for transmitting by the network control station on the first remote transmit frequency, to cause interference on the second remote receive frequency;

(b) means for losing link at the second remote station;

(c) means for sending a lost link indication from the second remote to the first remote station; and (d) means for performing a reset procedure at the first remote station.

23. The system for monitoring and controlling a single channel per carrier communication link of claim 22 wherein the means for performing a reset procedure at the first remote station further comprises:

(a) means for turning off the transmitter;

(b) means for reconfiguring the receive demodulator to the transmitter frequency;

(c) means for keeping the transmitter turned off if another signal is detected on the transmitter frequency; and (d) means for reconfiguring the receive demodulator back to the receiver frequency and turning on the transmitter if another signal is not longer detected on the transmitter frequency.

24. The system for monitoring and controlling a single channel per carrier communication link of claim 16 wherein the means for establishing a link between the network management control center and the second remote station further comprises:

(a) means for configuring the transmit frequency of the network management control center to the transmit frequency of the first remote station;

(b) means for configuring the receive frequency of the network management control center to the receive frequency of the first remote station;

(c) means for turning on the transmitter; and (d) means for establishing a link between the network management control center and the second remote station after the first remote station ceases transmission.

25. The system for monitoring and controlling a single channel per carrier communication link of claim 16 wherein the means for modifying link parameters at the second remote station further comprises:

(a) non volatile memory for storage of link parameters at the second remote station; and (b) means for using the overhead channel between the network management channel and the second remote station to modify link parameters in the non volatile memory of the second remote station.

26. The system for monitoring and controlling of a single channel per carrier communication link of claim 16 wherein the means for causing the second remote station to cease link further comprises:

(a) means for issuing a command to perform a timed reset over the link from the network management control center to the second remote station.

27. The system for monitoring and controlling a single channel per carrier communication link of claim 26 wherein the means for performing a timed reset further comprises:

(a) means for turning off the transmitter;

(b) means for executing a countdown timer;

(c) means for reconfiguring the receive demodulator to the transmitter frequency on expiration of the countdown timer;

(d) means for keeping the transmitter turned off if another signal is detected on the transmitter frequency; and (e) means for reconfiguring the receive demodulator back to the receiver frequency and turning on the transmitter if another signal is not longer detected on the transmitter frequency.

28. The system for monitoring and controlling a single channel per carrier communication link of claim 16 wherein the means for establishing a link between the network management control center and the first remote station further comprises:

(a) means for configuring the transmit frequency of the network management control center to the transmit frequency of the second remote station;

(b) means for configuring the receive frequency of the network management control center to the receive frequency of the second remote station;

(c) means for turning on the transmitter; and (d) means for establishing a link between the network management control center and the first remote station after the second remote station ceases transmission.

29. The system for monitoring and controlling a single channel per carrier communication link of claim 16 wherein the means for modifying link parameters at the first remote station further comprises:

(a) non volatile memory for storage of link parameters at the first remote station; and (b) means for using the overhead channel between the network management channel and the first remote station to modify link parameters in the non volatile memory of the first remote station.

30. The system for monitoring and controlling a single channel per carrier communication link of claim 16 wherein the means for causing the first and second remote stations to reestablish link using the modified link parameters further comprises:

(a) means for turning the transmitter off at the network management control center, resulting in no interference on the transmission frequencies of either the first or second remote stations and allowing the remote stations to re-establish link.

* * * * *